Feb. 6, 1962 R. D. RUMSEY 3,020,008
CONTROL SURFACE ACTUATOR DAMPER HINGE
Filed Oct. 1, 1957 2 Sheets-Sheet 1
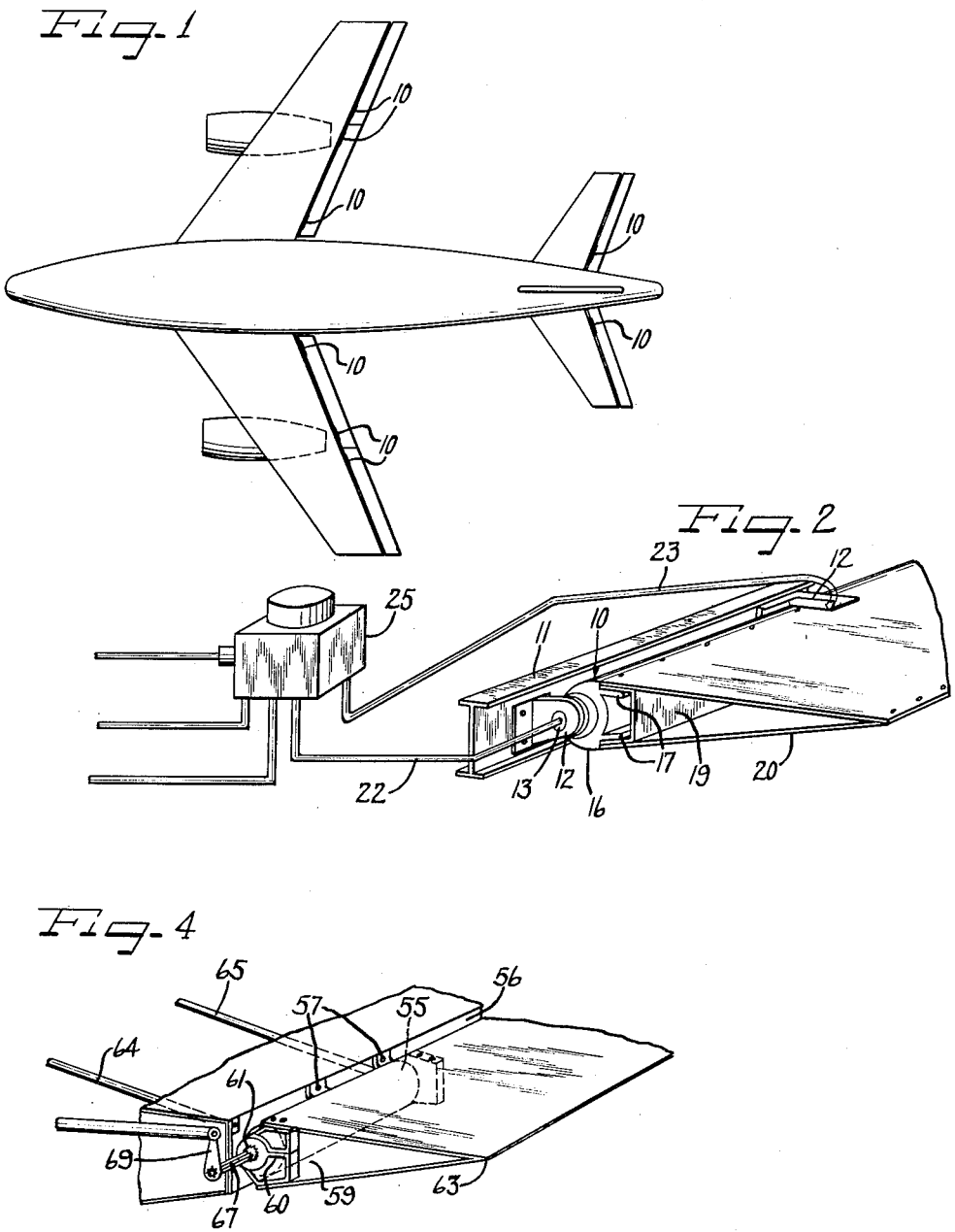
Inventor
Rollin Douglas Rumsey
by Hill, Sherman, Meroni, Gross & Simpson Attys

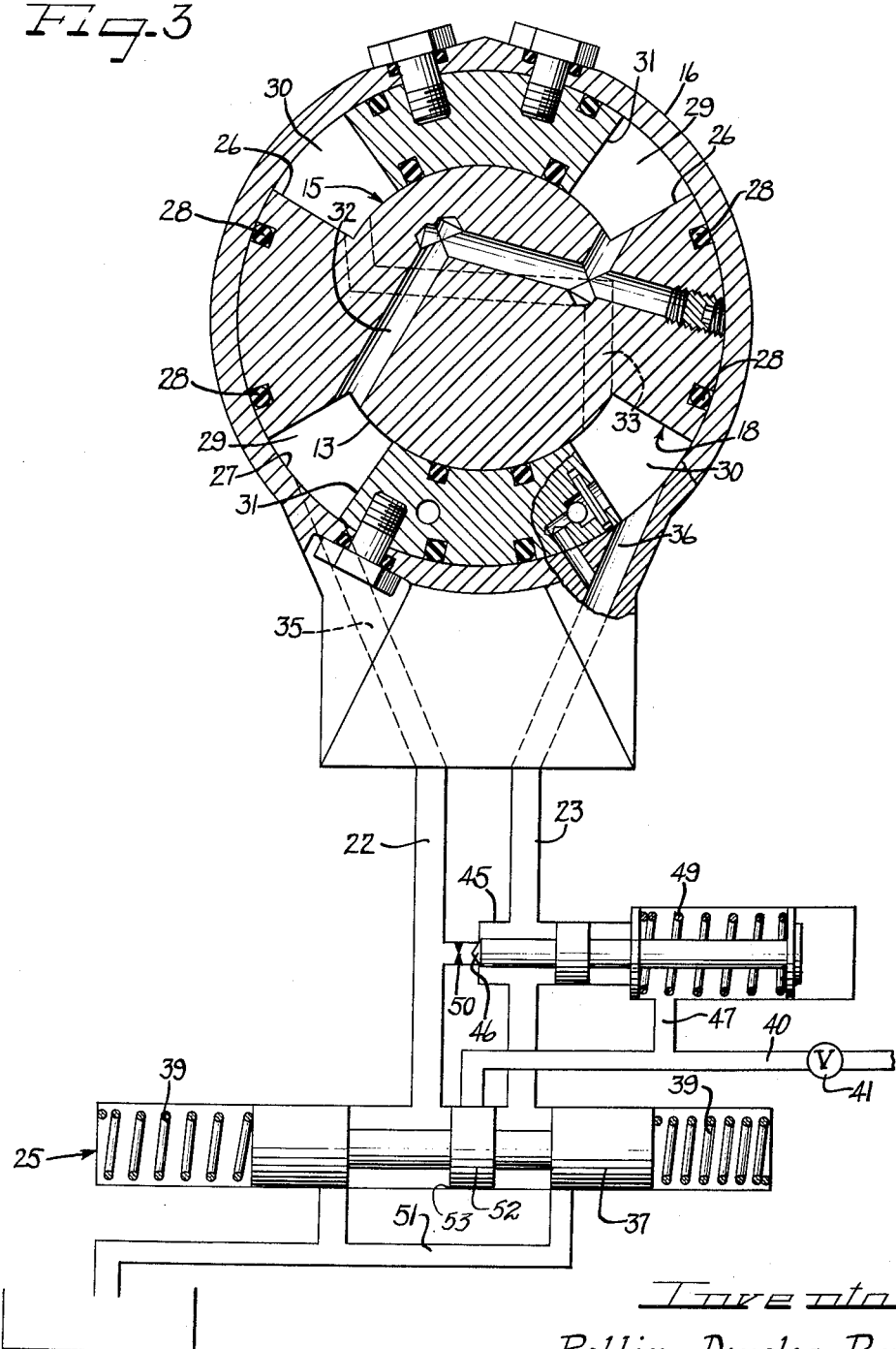

United States Patent Office 3,020,008
Patented Feb. 6, 1962

3,020,008
CONTROL SURFACE ACTUATOR DAMPER
HINGE
Rollin Douglas Rumsey, Buffalo, N.Y., assignor to Houdaille Industries, Inc., Buffalo, N.Y., a corporation of Michigan
Filed Oct. 1, 1957, Ser. No. 687,510
2 Claims. (Cl. 244—85)

This invention relates to improvements in hinged mountings for the movable parts of aircraft and more particularly relates to an improved form of hinged mounting forming an actuator for a control surface of aircraft and a damper for flutter thereof.

A principal object of the invention is to provide a flutter damper for damping flutter of the control surfaces of aircraft and serving as a hinge and actuator therefor.

Still another object of the invention is to provide a more compact and efficient hinge for the control surfaces or aircraft, so arranged as to form a rotary actuator and damper therefor.

Still another object of the invention is to provide a new and improved form of flutter damper in which a rotary pressure operated motor forms a support for a control surface of aircraft and positions the control surface in the desired position at the selection of the operator of the aircraft and damps the tendency of the control surface to flutter, all under the control of selectively operated valve means, effecting damping when the valve means is in a neutral position.

These and other objects of the invention will appear from time to time as the following specification proceeds and with reference to the accompanying drawing wherein:

FIGURE 1 is a diagrammatic view of an airplane, diagrammatically illustrating the positions of the actuators and damper hinges of the invention.

FIGURE 2 is a diagrammatic perspective view illustrating the hinged mounting of the control surface of an aircraft on the actuator damper hinge of the invention;

FIGURE 3 is a cross-sectional view taken through an illustrative form of actuator damper hinge, diagrammatically illustrating the fluid connections for damping and for controlling the supply of fluid under pressure to actuate the control surface; and FIGURE 4 is a perspective diagrammatic view illustrating a modified form in which the invention may be embodied.

In FIGURE 1 of the drawings, I have diagrammatically shown a series of actuator damper hinges 10 forming hinged mountings for the ailerons, wing flaps and elevators of an airplane. The actuator damper hinge may also form a hinge, actuator and flutter damper for the rudder of the airplane.

In the embodiment of the invention illustrated in FIGURE 2 of the drawings, I have shown a beam 11, which may be the beam of a wing, having spaced brackets 12 connected with the flange thereof and extending rearwardly therefrom and having a shaft 13 of an oscillating piston 15 (see FIGURE 3) mounted thereon and held from rotation with respect to said brackets. The shaft 13 projects from opposite sides of a housing 16, the interior of which forms a chamber for the actuator and damper.

The housing 16 is shown as having spaced chordal flanges 17 extending from the rear wall thereof, and recessed from the surface of the wall to receive a channel-like beam 19 and control surface 20, and form a support and hinge for said control surface. The control surface 20 may be a wing flap, aileron, elevator or rudder and may be secured to the chordal flanges 17 in any well-known manner, as by riveting or by an other suitable securing means.

As shown in FIGURES 2 and 3, fluid under pressure may be supplied to either side of the oscillatory piston 15 through pressure lines 22 and 23 connected with opposite ends of the stationary shaft 13. The shaft 13 is hollow and serves as conduits to supply fluid under pressure to the actuator to effect oscillatable movement of the housing 16, as fluid under pressure is admitted to the actuator through either of the pressure lines 22 or 23.

A well-known form of electrically controlled 4-way valve 25, such as a Moog or Cadillac gage valve may be provided to control the supply of fluid under pressure to either side of the actuator, such a valve being diagrammatically illustrated in FIGURES 2 and 3.

In the form of invention illustrated in FIGURE 3, illustratively showing a form of actuator damper which may be used, the oscillatory piston 15, with its shaft 13 is commonly called a wing shaft and is provided with a pair of diametrically opposed laterally projecting wings or vanes 26 having slidable engagement with an internal cylindrical wall 27 of the housing 16 and sealed thereto as by resilient seals 28 recessed in the face thereof.

Working chambers 29 and 30 are defined by opposite faces of diametrically opposed fluid reaction abutments 31 and the adjacent faces of the vanes 26. The fluid reaction abutments 31 are sealed to the cylindrical wall 27 and extend into sealing engagement with the shaft portion of the oscillatory piston between the wings 26 thereof.

The working chambers 29 are shown as being connected together by a passageway 32 leading through the interior of the oscillatory piston 15. The working chambers 30 are shown as being connected together by a similar passageway 33.

For the purpose of illustrating the fluid pressure system for applying fluid pressure to either chamber 29 or 30, as shown in FIGURE 3, pressure passageways 35 and 36 are shown as being connected with the pressure lines 22 and 23 respectively, and lead through the wall of the housing 16 into the respective chambers 29 and 30, rather than through the hollow interior of the shaft 13 as shown in FIGURE 2. The servo-valve 25 is shown as having a valve spool 37 for controlling the admission of fluid under pressure to either of the chambers 29 or 30 through the pressure lines 22 or 23. The valve spool 37 is diagrammatically shown as being centered by centering springs 39 acting on opposite ends of the valve spool. A pressure line 40 is shown as leading to the valve 25 to supply fluid under pressure thereto.

The pressure lines 22 and 23 are connected together by a by-pass line 45 closed by a by-pass valve 46 operated by fluid under pressure supplied through a pressure line 47 connected with the pressure line 40. A spring 49 is provided to bias the valve 46 into an open position. The by-pass line 45 has a damping orifice 50 therein serving as an energy absorbing fluid restriction orifice to damp flutter when the valve 46 is opened by the spring 49.

A return line 51 leads from the valve 25 back to tank to return fluid from one set of working chambers of the actuator and damper as fluid under pressure is applied to the other set of working chambers.

In order to effect clockwise rotary movement of the housing 16 as viewed in FIGURE 3, the valve spool 37 is moved to the right. Pressure is then supplied to the working chambers 29 through the pressure line 22. The working chambers 30 will then be connected with the return line 51 through the valve 25.

Counterclockwise rotation of the shaft 13 is produced by shifting the valve spool 37 to the left, to supply fluid under pressure from the pressure line 40 through the pressure lines 23 and 36, exhaust fluid being returned to tank through the lines 35 and 22 and valve 25 communicating with the return line 51.

A piston 52 of the valve spool 37 is underlapped as indicated by reference character 53 to provide a leak path to damp the tendency of the control surface to flutter.

During actuation of the oscillatory piston 15 and the control surface 20, pressure in the pressure line 40 maintains the by-pass valve 46 closed. In the event, however, of hydraulic system failure, the by-pass valve 46 will be opened by its biasing spring 49. The control surface may then be readily moved by its pilot (not shown).

In the form of the invention diagrammatically illustrated in FIGURE 4, a mechanical control is diagrammatically shown for controlling the admission of fluid under pressure to either of the working chambers 29 or 30 of the damper. As shown in FIGURE 4, the damper actuator hinge is shown as being in the form of a stationary housing 55 secured to a beam 56 as by brackets 57. A support bracket 59 is shown as extending along the damper housing 55 in outwardly spaced relation with respect thereto and as having inwardly extending end portions 60 splined or otherwise secured to an oscillatory damper shaft 61. The support bracket 59 is shown as having a control surface 63 secured thereto as by riveting. Pressure lines 64 and 65 are shown as leading to opposite ends of the damper housing for supplying fluid under pressure thereto under the control of a valve shaft 67 extending within the center of the damper shaft 61 and rotatable to operate a control valve (not shown), which may be contained within the damper shaft in the interior of the housing 55. A link and crank, indicated generally by reference character 69, may be provided to control operation of the valve shaft 67. The control valve within the damper shaft 61 may be of any well known form and may either be a spool valve rectilinearly moved upon pivotal movement of the control valve shaft 67 and operating on principles similar to the valve 25, or may be a rotary type 4-way servo valve and no part of the present invention so not herein shown or described further. Since the control valve is in the wing shaft which is attached to the movable surface, automatic valve follow up motion will occur as the wing shaft pivotally moves in one direction or another.

It will be apparent from the foregoing that many modifications and variations in the present invention may be effected without departing from the spirit and scope of the novel concepts thereof.

I claim as my invention:

1. In a damping and actuating device particularly adapted for the stationary and movable parts of aircraft and the like, a housing adapted to be secured to one part of the aircraft and having a cylindrical chamber therein, an oscillatory piston within said chamber and having a shaft extending therefrom adapted to have connection with another part of the aircraft, fluid pressure passageways communicating with opposite sides of said piston, valve means operable to admit fluid under pressure to either of said passageways to effect relative movement of said housing and piston with respect to each other, and a damping orifice connected between said passageways between said valve means and said piston and normally closed by fluid pressure, upon the supply of fluid under pressure to either of said passageways and opening upon the failure of fluid pressure flowing to said passageways to accommodate the by-pass of fluid under pressure through either side of said piston.

2. In a damping and actuating means particularly adapted for the stationary and movable parts of aircraft and the like, a housing adapted to be secured to one part of the aircraft and having a cylindrical chamber therein, an oscillatory piston within said chamber and having a shaft extending therefrom adapted to have connection with another part of the aircraft, fluid pressure passageways communicating with opposite sides of said piston, valve means operable to admit fluid under pressure to either of said passageways to effect relative movement of said housing and piston with respect to each other, said valve means including a valve piston having a neutral position between said passageways and providing a leakage path between said passageways when in a neutral position to damp the tendency of the movable part to flutter, a by-pass passageway between said passageways having an orifice therein, a valve closed by fluid under pressure for blocking the flow of fluid through said by-pass passageway, and spring means opening said valve upon the failure of fluid under pressure.

References Cited in the file of this patent

UNITED STATES PATENTS

| | | |
|---|---|---|
| 2,708,907 | Shafer | May 24, 1955 |
| 2,721,714 | Clifton | Oct. 25, 1955 |
| 2,751,822 | Schlitz | June 26, 1956 |
| 2,758,806 | Feeney | Aug. 14, 1956 |
| 2,854,956 | Hager | Oct. 7, 1958 |
| 2,870,748 | Hemphill | Jan. 27, 1959 |

FOREIGN PATENTS

| | | |
|---|---|---|
| 49,534 | Holland | Oct. 15, 1940 |